(12) United States Patent
Ande et al.

(10) Patent No.: US 12,250,191 B2
(45) Date of Patent: *Mar. 11, 2025

(54) SYSTEMS AND METHODS FOR SOCIAL NETWORK ASSISTANCE

(71) Applicant: American Airlines, Inc., Fort Worth, TX (US)

(72) Inventors: Murali M. Ande, Flower Mound, TX (US); Annette G. Hernandez, Keller, TX (US); Gaurav H. Nasit, Irving, TX (US); Paul I. P. Piemonti, Fort Worth, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/854,020

(22) Filed: Apr. 21, 2020

(65) Prior Publication Data

US 2020/0252364 A1 Aug. 6, 2020

Related U.S. Application Data

(63) Continuation of application No. 16/275,432, filed on Feb. 14, 2019, now Pat. No. 10,666,599, which is a continuation of application No. 14/323,222, filed on Jul. 3, 2014, now Pat. No. 10,237,225.

(51) Int. Cl.
G06Q 50/00 (2024.01)
G06Q 30/016 (2023.01)
H04L 51/046 (2022.01)
H04L 51/52 (2022.01)

(52) U.S. Cl.
CPC .......... *H04L 51/52* (2022.05); *G06Q 30/016* (2013.01); *G06Q 50/01* (2013.01); *H04L 51/046* (2013.01)

(58) Field of Classification Search
None
See application file for complete search history.

(56) References Cited

U.S. PATENT DOCUMENTS

| 5,862,322 A * | 1/1999 | Anglin ................... G06Q 10/10 714/57 |
| 8,892,645 B2 * | 11/2014 | Jones ................... H04L 12/1822 709/204 |
| 9,224,147 B2 * | 12/2015 | Franco ................. G06Q 30/016 |
| 2010/0190510 A1 * | 7/2010 | Maranhas .......... G06Q 30/0261 705/14.66 |

(Continued)

OTHER PUBLICATIONS

Non-Final Office Action dated Mar. 21, 2017 in U.S. Appl. No. 14/323,222.

(Continued)

Primary Examiner — Andrew B Whitaker
(74) Attorney, Agent, or Firm — SNELL & WILMER L.L.P.

(57) ABSTRACT

A computer based system for social network assistance is disclosed. Via use of the system and related methods, a high-volume social media account (for example, an airline Twitter account) may be managed to enable prompt and thorough responses to incoming social media messages. In this manner, customer issues and feedback may be more effectively addressed, resulting in improved customer satisfaction and goodwill associated with the owner of the high-volume social media account.

20 Claims, 5 Drawing Sheets

(56) References Cited

U.S. PATENT DOCUMENTS

| | | | |
|---|---|---|---|
| 2011/0191417 A1* | 8/2011 | Rathod | G06Q 30/02 709/204 |
| 2012/0036204 A1* | 2/2012 | Cole | G06Q 10/10 709/206 |
| 2012/0036205 A1* | 2/2012 | Cole | H04L 51/52 709/206 |
| 2012/0072358 A1* | 3/2012 | Famous | G06Q 50/01 705/319 |
| 2013/0103667 A1* | 4/2013 | Minh | G06F 16/951 707/730 |
| 2013/0179440 A1* | 7/2013 | Gordon | G06Q 10/06 707/E17.014 |
| 2013/0254397 A1* | 9/2013 | Lai | H04L 65/40 709/225 |
| 2013/0282594 A1* | 10/2013 | Gaedcke | G06Q 30/0201 705/304 |
| 2014/0081909 A1* | 3/2014 | Price | G06F 16/23 707/609 |
| 2014/0164476 A1* | 6/2014 | Thomson | G06Q 10/101 709/203 |
| 2014/0164502 A1* | 6/2014 | Khodorenko | H04M 3/5191 709/204 |
| 2014/0244351 A1* | 8/2014 | Symons | G06Q 30/0201 705/7.29 |
| 2015/0081569 A1* | 3/2015 | Moore | H04W 4/21 709/204 |
| 2015/0095073 A1* | 4/2015 | Li | G06Q 30/0269 705/6 |
| 2015/0302103 A1* | 10/2015 | Jeremias | G06Q 10/107 715/758 |
| 2016/0148200 A1* | 5/2016 | Pureetip | G06Q 20/381 705/39 |

OTHER PUBLICATIONS

Final Office Action dated Sep. 14, 2017 in U.S. Appl. No. 14/323,222.
Advisory Action dated Nov. 27, 2017 in U.S. Appl. No. 14/323,222.
Non-Final office action dated Mar. 15, 2018 in U.S. Appl. No. 14/323,222.
Final office action dated Jul. 5, 2018 in U.S. Appl. No. 14/323,222.
Advisory Action dated Sep. 21, 2018 in U.S. Appl. No. 14/323,222.
Notice of Allowance dated Jan. 29, 2019 in U.S. Appl. No. 14/323,222.
Non-Final Office Action dated Aug. 7, 2019 in U.S. Appl. No. 16/275,432.
Final Office Action dated Jan. 27, 2020 in U.S. Appl. No. 16/275,432.
Notice of Allowance dated Feb. 20, 2020 in U.S. Appl. No. 16/275,432.

* cited by examiner

SYSTEMS AND METHODS FOR SOCIAL NETWORK ASSISTANCE

CROSS-REFERENCE TO RELATED APPLICATIONS

This application is a continuation of, claims priority to and the benefit of, U.S. patent application Ser. No. 16/275,432 filed on Feb. 14, 2019 and entitled "SYSTEMS AND METHODS FOR SOCIAL NETWORK ASSISTANCE." The '432 application is a continuation of, claims priority to and the benefit of, U.S. patent application Ser. No. 14/323,222 filed on Jul. 3, 2014 (aka U.S. Pat. No. 10,237,225 which issued Mar. 19, 2019) and entitled "SYSTEMS AND METHODS FOR SOCIAL NETWORK ASSISTANCE". The foregoing applications are hereby incorporated by reference in their entirety for all purposes.

TECHNICAL FIELD

The present disclosure generally relates to social media, and more particularly, to response and integration methods and tools suitable for interaction on social networks at scale.

BACKGROUND

Large corporations, particularly in the service industries, typically interact with thousands of customers on a given day. Positive customer experiences facilitate long-term business relationships and are desirable for profitability. As a result, service companies, for example airlines, financial institutions, and the like, typically seek new approaches for interacting with customers and innovative ways to reduce response times (for example, reduced phone support queues, faster reply time to customer tweets, etc.) and/or improve customer satisfaction (e.g., optimizing existing processes).

Current technology enables customer-company interaction across a wide variety of systems and platforms, including but not limited to telephone, email, instant messaging, text messaging, video teleconferencing, social media postings, and/or the like. Consistent, prompt, helpful customer service remains desirable, regardless of the customer interaction platform. In particular, social networks and communications therein offer wide exposure and corresponding opportunity to demonstrate excellent customer service to a wider audience than a one-on-one phone call, email chain, or the like. Accordingly, improved social network assistance systems and/or tools remain desirable. For example, systems and methods capable of managing a micro-blogging (e.g., "twitter") stream in connection with a high volume of stream activity are desirable.

SUMMARY

In an exemplary embodiment, a method for social network management comprises: receiving, at a social network assistance system, a tweet associated with a social media account; locking the tweet so that only one social network assistance system user may interact with that tweet; displaying the content of the tweet for evaluation; receiving, responsive to the evaluation, a response to the tweet; and submitting, to a social network associated with the social media account, the response to the tweet.

In another exemplary embodiment, a method for social network management comprises: receiving, at a social network assistance system, a tweet associated with a social media account; identifying, via the social network assistance system, the author of the tweet as an individual having an elevated priority; escalating the priority of the tweet within the social network assistance system to facilitate more rapid response to the tweet; evaluating, via the social network assistance system, the content of the tweet to facilitate preparation of a response; and submitting, via the social network assistance system, the response to the tweet.

In another exemplary embodiment, a method for social network management comprises: receiving, at a social network assistance system, a tweet associated with a social media account; flagging, in the social network assistance system, the tweet for response by a particular user of the social network assistance system; evaluating, via the social network assistance system, the content of the tweet; preparing a response to the tweet; and submitting, via the social network assistance system, the response to the tweet.

In still another exemplary embodiment, a non-transitory computer-readable storage medium has computer-executable instructions stored thereon that, in response to execution by a computer system for social network assistance, causes the computer system to perform operations comprising: receiving a tweet associated with a social media account; locking the tweet so that only one computer system user may interact with that tweet; displaying, to a user of the computer system, the content of the tweet for evaluation; receiving, from the user of the computer system and responsive to the evaluation, a response to the tweet; and submitting, to a social network associated with the social media account, the response to the tweet.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

Figure 1A:
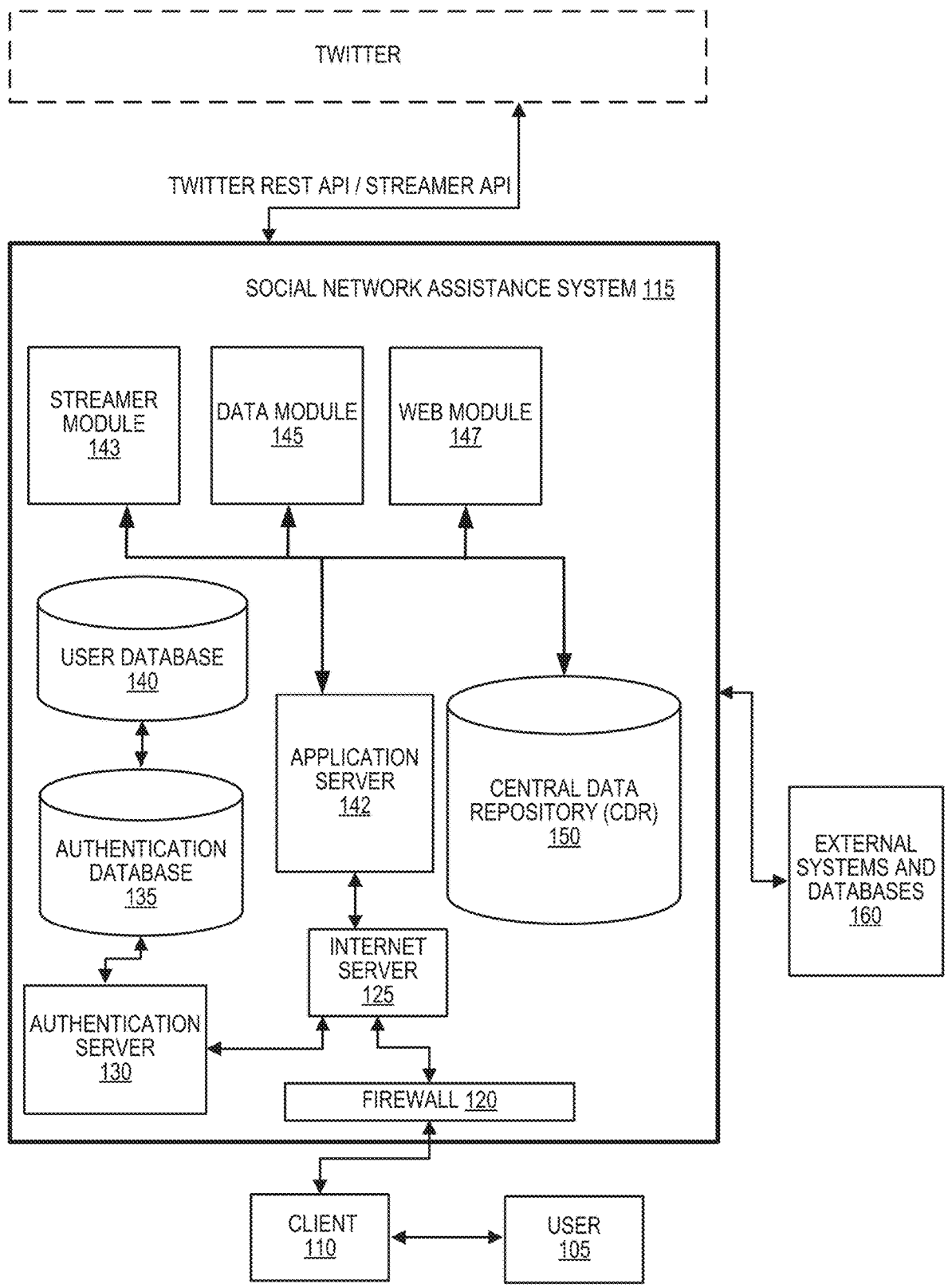
FIG. 1A is a block diagram illustrating exemplary social network assistance system components in accordance with various embodiments.
Figure 1B:
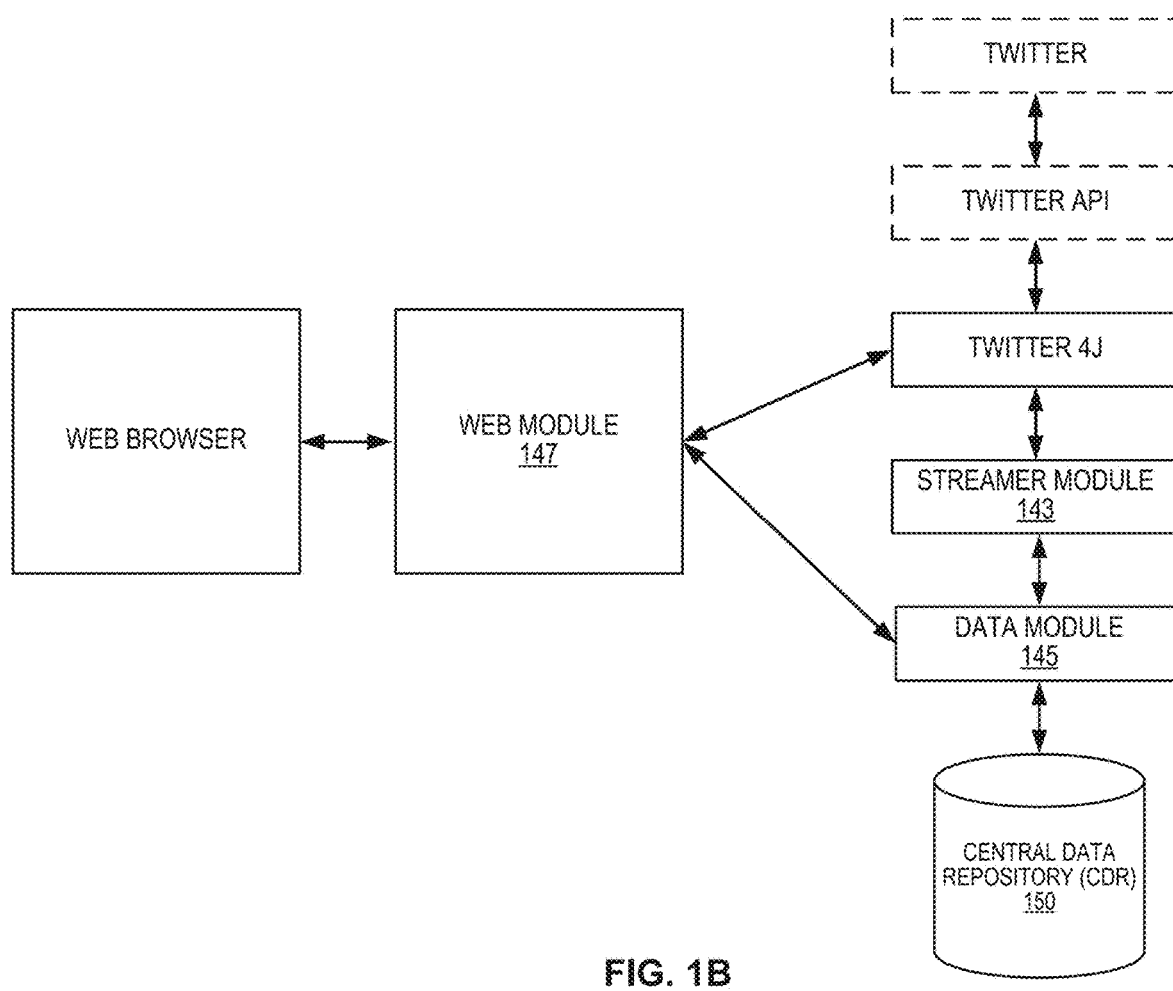
FIG. 1B is a block diagram illustrating exemplary social network assistance system components in accordance with various embodiments.
Figure 1C:
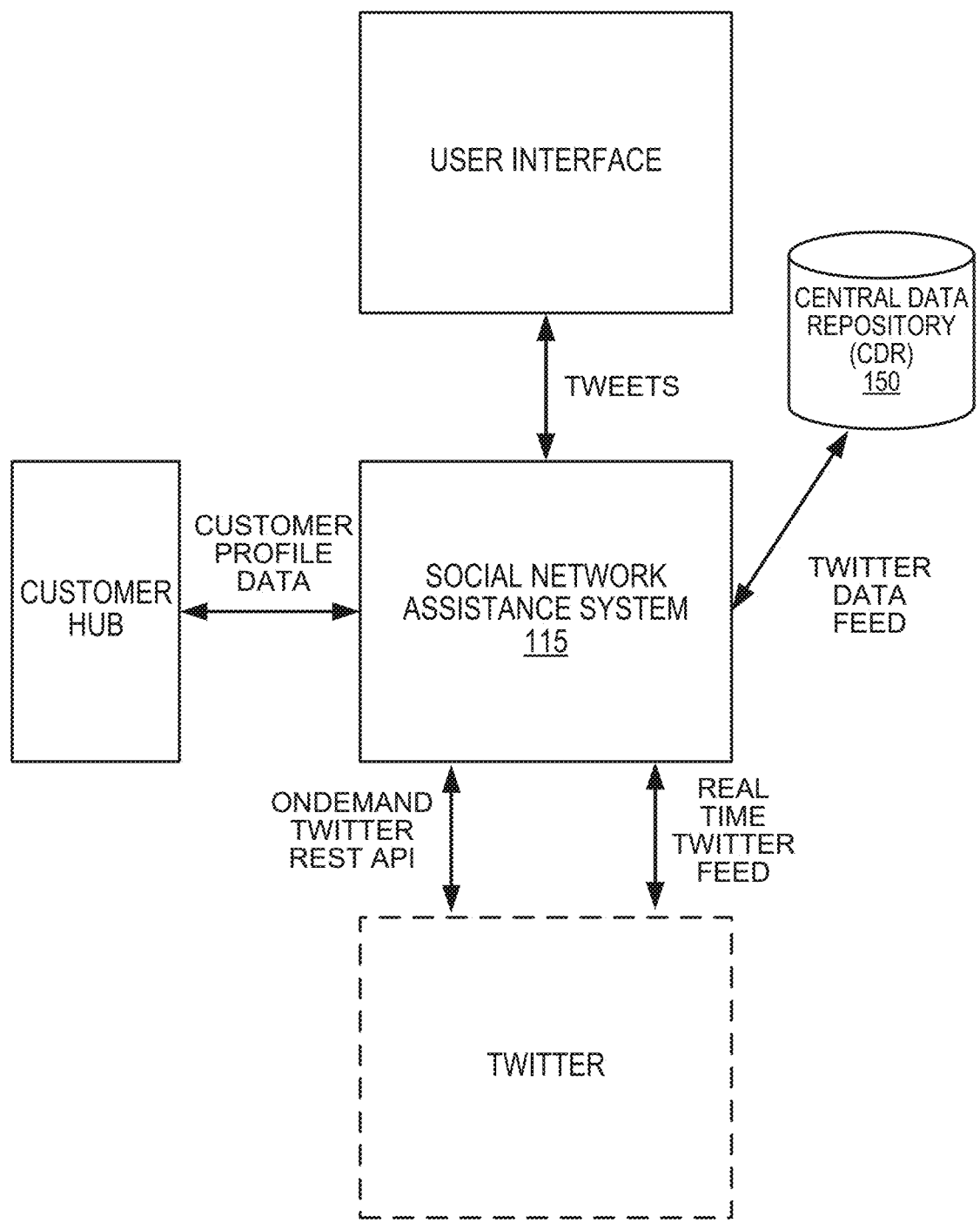
FIG. 1C illustrates data flow in an exemplary social network assistance system in accordance with various embodiments.
Figure 1D:
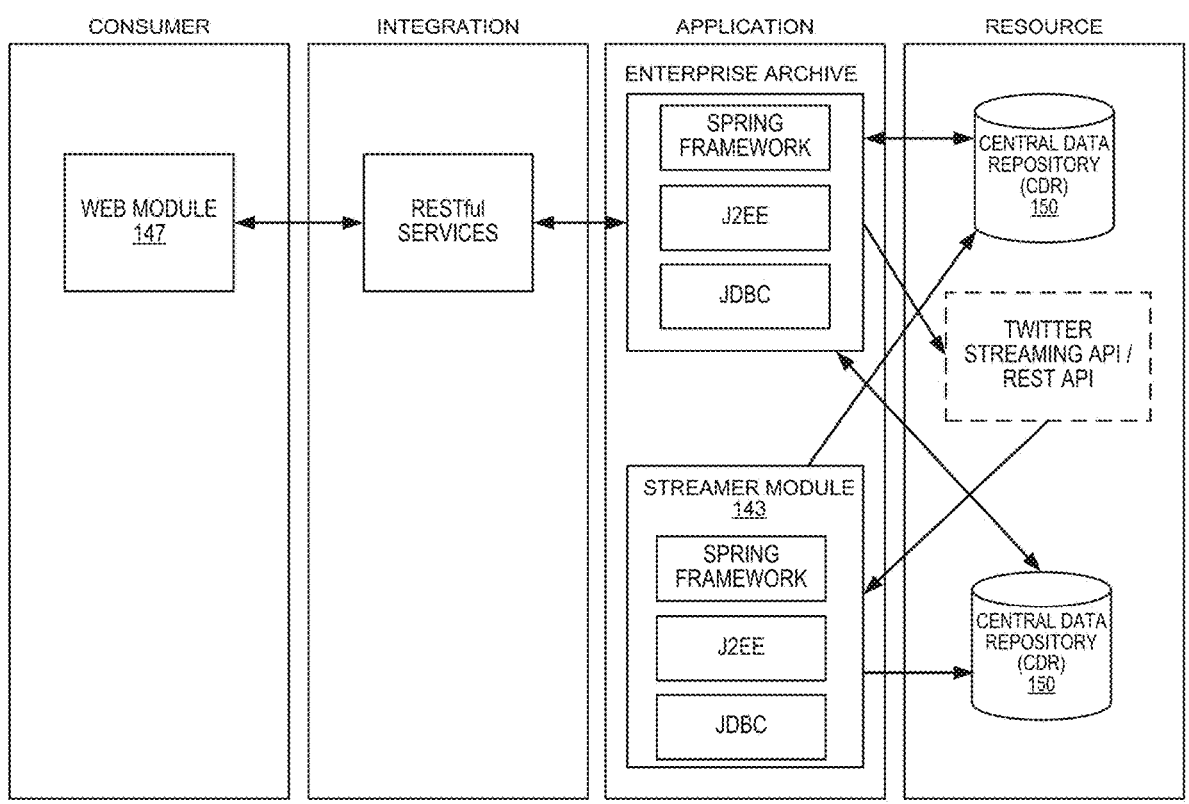
FIG. 1D illustrates logical relationships in an exemplary social network assistance system in accordance with various embodiments.

Functionality of the present disclosure can partially or fully reshape the way organizations interact with customers and/or the general public, for example via public or quasi-public communication channels such as social media. For example, functionality of the present disclosure enables organizations to more rapidly respond to customer social media postings (e.g., Twitter "tweets", Facebook posts, Instagram image posts, and/or the like). Stated another way, functionality of the present disclosure allows large organizations to effectively integrate social media customer interaction channels at enterprise scales.

While the present disclosure discusses "airlines" and "customers" for purposes of convenience and illustration, one of skill in the art will appreciate that the social media methods, systems, and tools disclosed herein are broadly applicable, for example to any company, organization or service industry, such as banking, credit cards, retail, and the like.

Various embodiments of the present disclosure employ statistical analysis and/or optimization techniques. For more information regarding such techniques refer to, for example: "Using Multivariate Statistics (5th Edition)" by Barbara G. Tabachnick and Linda S. Fidell; and "Introduction to Operations Research" by Friedrich S. Hiller and Gerald J. Lieberman, McGraw-Hill 7th edition, Mar. 22, 2002; the contents of which are each hereby incorporated by reference in their entireties.

In various embodiments, exemplary social network assistance systems include a user interface ("UI"), software modules, logic engines, various databases, interfaces to systems and tools, and/or computer networks. While exemplary social network assistance systems may contemplate upgrades or reconfigurations of existing processing systems, changes to existing databases and system tools are not necessarily required by principles of the present disclosure.

The benefits provided by functionality of the present disclosure include, for example, increased customer goodwill, decreased customer response time, increased public goodwill, improved problem resolution outcomes, increased revenue, lower costs, increased seat utilization, increased planning and operational efficiency, increased employee morale, and the like. For example, a customer service organization benefits from reduced customer response times, resulting in improved customer satisfaction with customer service processes and thus increasing the likelihood of future business, repeat business, and/or the like. Customers benefit from shortened wait times, a single point of contact for problem resolution, and the like.

As used herein, a "tweet" refers to a user post via the microblogging tool (e.g., Twitter). More broadly, a "tweet" may be considered to represent an exemplary post, entry, or other user content on or via a social media site, tool, app, and/or the like (e.g., a discussion of a "tweet" may be considered to illustrate representative principles applicable to various social media platforms, and not only to Twitter specifically).

An "entity" may include any individual, software program, business, organization, government entity, web site, system, hardware, and/or any other entity. A "user" may include any entity that interacts with a system and/or participates in a process.

Turning now to FIG. 1A, in accordance with various embodiments, a user 105 may perform tasks such as requesting, retrieving, receiving, updating, analyzing and/or modifying data. User 105 may also perform task such as initiating, manipulating, interacting with or using a software application, tool, module or hardware, and initiating, receiving or sending a communication. User 105 may interface with Internet server 125 via any communication protocol, device or method discussed herein, known in the art, or later developed. User 105 may be, for example, a member of a marketing organization, a member of a social media response team, a downstream system, an upstream system, a third-party system, a system administrator, and/or the like.

In various embodiments, a user 105 may interface with a social network assistance system 115 by way of a client 110. Social network assistance system 115 may be a partially or fully integrated system comprised of various subsystems, modules and databases. Client 110 comprises any hardware and/or software suitably configured to facilitate entering, accessing, requesting, retrieving, updating, analyzing and/or modifying data. The data may include airline operational data (e.g., schedules, resources, routes, operational alerts, weather, etc.), passenger data (e.g., name, address, telephone, rewards program identifier, social media username, historical transaction information, and/or the like), cost data, forecasts, historical data, verification data, legal/regulatory data, authentication data, demographic data, transaction data, social media profile data, public and/or private social media posts, influencer data (e.g., "Klout" score and/or the like), prior customer service incidents and/or resolutions, baggage tracking information, loyalty program information, or any other suitable information discussed herein.

Client 110 includes any device (e.g., a computer), which communicates, in any manner discussed herein, with social network assistance system 115 via any network or protocol discussed herein. Browser applications comprise Internet browsing software installed within a computing unit or system to conduct online communications and transactions. These computing units or systems may take the form of personal computers, mobile phones, personal digital assistants, mobile email devices, laptops, notebooks, hand-held computers, portable computers, kiosks, and/or the like. Practitioners will appreciate that client 110 may or may not be in direct contact with social network assistance system 115. For example, client 110 may access the services of social network assistance system 115 through another server, which may have a direct or indirect connection to Internet server 125. Practitioners will further recognize that client 110 may present interfaces associated with a software application (e.g., a social media application or the like) or module that are provided to client 110 via application GUIs or other interfaces and are not necessarily associated with or dependent upon Internet browsers or Internet specific protocols.

User 105 may communicate with social network assistance system 115 through a firewall 120, for example to help ensure the integrity of social network assistance system 115 components. Internet server 125 may include any hardware and/or software suitably configured to facilitate communications between the client 110 and one or more social network assistance system 115 components.

Firewall 120, as used herein, may comprise any hardware and/or software suitably configured to protect social network assistance system 115 components from users of other networks. Firewall 120 may reside in varying configurations including stateful inspection, proxy based and packet filtering, among others. Firewall 120 may be integrated as software within Internet server 125, any other social network assistance system 115 component, or may reside within another computing device or may take the form of a standalone hardware component.

Authentication server 130 may include any hardware and/or software suitably configured to receive authentication credentials, encrypt and decrypt credentials, authenticate credentials, and/or grant access rights according to predefined privileges associated with the credentials. Authentication server 130 may grant varying degrees of application and/or data level access to users based on information stored within authentication database 135 and user database 140. Application server 142 may include any hardware and/or software suitably configured to serve applications and data to a connected client 110.

In accordance with various embodiments, social network assistance system 115 is usable to facilitate interaction with and/or management of a high-volume (for example, 1000+ tweets per day) social media data stream, for example the official Twitter stream of a large corporate entity. Continuing to reference FIG. 1A, social network assistance system 115 allows communication with central data repository (CDR) 150, and with various other databases, tools, UIs and systems (not shown in FIG. 1A). Such systems include, for example, airline scheduling systems, passenger booking and reservations systems, customer relationship management (CRM) systems, revenue management systems, inventory systems, and/or the like.

Social network assistance system 115 components are interconnected and communicate with one another to allow for a completely integrated network assistance system. In various embodiments, social network assistance system 115 facilitates group management of a single Twitter feed; stated another way, social network assistance system 115 can allow multiple individuals to collaborate to assess, evaluate, respond to, and otherwise manage Twitter stream content in a rapid and/or real-time manner, while avoiding undesirable outcomes such as duplicate replies, inadvertent insertion of undesirable, offensive, irrelevant, or confidential content, and/or the like. Airline customer service systems may further interact with (and/or otherwise service or assist) customers based at least in part on the output, capabilities, and/or results of social network assistance system 115.

In various embodiments, social network assistance system 115 modules (e.g., streamer module 143, data module 145, web module 147, and other social network assistance system 115 modules not shown in FIG. 1A) are software modules configured to enable online functions such as sending and receiving messages, receiving query requests, configuring responses, dynamically configuring user interfaces, requesting data, receiving data, displaying data, executing complex processes, calculations, forecasts, mathematical techniques, workflows and/or algorithms, prompting user 105, verifying user responses, authenticating the user, initiating social network assistance system 115 processes, initiating other software modules, triggering downstream systems and processes, encrypting and decrypting, and/or the like. Additionally, social network assistance system 115 modules may include any hardware and/or software suitably configured to receive requests from client 110 via Internet server 125 and/or application server 142.

Social network assistance system 115 modules may be further configured to process requests, execute transactions, construct database queries, and/or execute queries against databases within social network assistance system 115 (e.g., central data repository ("CDR") 150), external data sources and/or temporary databases. In various embodiments, one or more social network assistance system 115 modules may be configured to execute application programming interfaces in order to communicate with a variety of messaging platforms, such as Twitter, Facebook, email systems, wireless communications systems, mobile communications systems, multimedia messaging service ("MMS") systems, short messaging service ("SMS") systems, and the like.

Social network assistance system 115 modules may be configured to exchange data with other systems and application modules, for example an airline customer data system, an airline reservation system, an internal airline messaging system, and/or the like. In various embodiments, social network assistance system 115 modules may be configured to interact with other social network assistance system 115 components to perform complex calculations, retrieve additional data, format data into reports, create XML representations of data, construct markup language documents, construct, define or control UIs, create tweets, and/or the like. Moreover, social network assistance system 115 modules may reside as standalone systems or tools, or may be incorporated with the application server 142 or any other social network assistance system 115 component as program code. As one of ordinary skill in the art will appreciate, social network assistance system 115 modules may be logically or physically divided into various subcomponents, such as a workflow engine configured to evaluate predefined rules and to automate processes.

In addition to the components described above, social network assistance system 115 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; a plurality of databases, and/or the like.

As will be appreciated by one of ordinary skill in the art, one or more social network assistance system 115 components may be embodied as a customization of an existing system, an add-on product, upgraded software, a stand-alone system (e.g., kiosk), a distributed system, a method, a data processing system, a device for data processing, and/or a computer program product. Accordingly, individual social network assistance system 115 components may take the form of an entirely software embodiment, an entirely hardware embodiment, or an embodiment combining aspects of both software and hardware. Furthermore, individual social network assistance system 115 components may take the form of a computer program product on a non-transitory computer-readable storage medium having computer-readable program code means embodied in the storage medium. Any suitable computer-readable storage medium may be utilized, including magnetic storage devices (e.g., hard disks), optical storage devices, (e.g., DVD-ROM, CD-ROM, etc.), electronic storage devices (e.g., flash memory), and/or the like.

Client 110 may include an operating system (e.g., Windows, UNIX, Linux, Solaris, MacOS, iOS, Android, Windows Mobile OS, Windows CE, Palm OS, Symbian OS, Blackberry OS, J2ME, etc.) as well as various conventional support software and drivers typically associated with mobile devices and/or computers. Client 110 may be in any environment with access to any network, including both wireless and wired network connections. In various embodiments, access is through a network or the Internet through a commercially available web-browser software package. Client 110 and social network assistance system 115 components may be independently, separately, or collectively coupled to the network via data links which include, for example, a connection to an Internet Service Provider (ISP) over the local loop as is typically used in connection with standard wireless communications networks and/or methods, such as modem communication, cable modem, satellite networks, ISDN, digital subscriber line (DSL), and/or the like. In various embodiments, any portion of client 110 may be partially or fully connected to a network using a wired ("hard wire") connection. As those skilled in the art will appreciate, client 110 and/or any of the system components may include wired and/or wireless portions.

Internet server 125 may be configured to transmit data to client 110, for example within markup language documents. "Data" may include encompassing information such as commands, messages, transaction requests, queries, files, data for storage, and/or the like in digital or any other form. Internet server 125 may operate as a single entity in a single geographic location or as separate computing components located together or in separate geographic locations. Further, Internet server 125 may provide a suitable web site or other Internet-based graphical user interface, which is accessible by users (such as user 105). In various embodiments, Microsoft Internet Information Server (IIS), Microsoft Transaction Server (MTS), and Microsoft SQL Server, are used in conjunction with a Microsoft operating system, Microsoft NT web server software, a Microsoft SQL Server database system, and a Microsoft Commerce Server. In various embodiments, the well-known "LAMP" stack (Linux, Apache, MySQL, and PHP/Perl/Python) is used to enable social network assistance system 115. Additionally, components such as Access or Microsoft SQL Server, Oracle, Sybase, InterBase, etc., may be used to provide an Active Data Object (ADO) compliant database management system or other suitable database or databases for use in social network assistance system 115.

Like Internet server 125, application server 142 may communicate with any number of other servers, databases and/or components through any means known in the art. Further, application server 142 may serve as a conduit between client 110 and the various systems and components of social network assistance system 115. Internet server 125 may interface with application server 142 through any means known in the art including a LAN/WAN, for example. Application server 142 may further invoke software modules, such as streamer module 143, data module 145, web module 147, and/or the like, automatically or in response to user 105 requests.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like. A server may include a web service that receives a request from a web server, the request including a URL (e.g., http://yahoo.com) and/or an internet protocol ("IP") address. The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise" (2003).

Continuing to reference FIG. 1A, illustrated are databases that are included in various embodiments. An exemplary list of various databases used herein includes: an authentication database 135, a user database 140, CDR 150 and/or other databases that aid in the functioning of the system. As practitioners will appreciate, while depicted as separate and/or independent entities for the purposes of illustration, databases residing within social network assistance system 115 may represent multiple hardware, software, database, data structure and networking components. Furthermore, embodiments are not limited to the databases described herein, nor do embodiments necessarily utilize each of the disclosed databases.

Authentication database 135 may store information used in the authentication process such as, for example, user identifiers, passwords, access privileges, user preferences, user statistics, and the like. User database 140 maintains user information and credentials for social network assistance system 115 users (e.g., user 105).

In various embodiments, CDR 150 is a data repository that may be configured to store a wide variety of comprehensive data for social network assistance system 115. While depicted as a single logical entity in FIG. 1A, those of skill in the art will appreciate that CDR 150 may, in various embodiments, consist of multiple physical and/or logical data sources. In various embodiments, CDR 150 stores customer data, social network data, operational data, schedules, resource data, asset data, inventory data, personnel information, passenger data, reservation data, cost data, historical data, verification data, authentication data, demographic data, legal data, regulatory data, transaction data, security profiles, access rules, content analysis rules, audit records, predefined rules, process definitions, financial data, and the like. For example, in various exemplary embodiments a data source or component database of CDR 150 includes information such as flight data, customer data, customer relationship data, loyalty program data, baggage tracking data, authentication data, and/or the like. Moreover, CDR 150 may interface with and/or access (either directly or via operation of other components of social network assistance system 115) various external data sources and/or application programming interfaces (APIs), for example a Twitter API, Facebook API, Klout API, and/or the like.

Any databases discussed herein may include relational, hierarchical, graphical, or object-oriented structure and/or any other database configurations. Common database products that may be used to implement the databases include DB2 by IBM (Armonk, NY), various database products available from Oracle Corporation (Redwood Shores, CA), Microsoft Access or Microsoft SQL Server by Microsoft Corporation (Redmond, Wa), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of social network assistance system 115 may consist of any combination thereof at a single location or at multiple locations, wherein each database or system includes any of various suitable security features, such as firewalls, access codes, encryption, decryption, compression, decompression, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, Flash, ActionScript, FLEX, VBScript, Macromedia Cold Fusion, COBOL, Microsoft Active Server Pages, assembly, PERL, SAS, PHP, awk, Python, Visual Basic, SQL Stored Procedures, PL/SQL, any UNIX shell script, and/or extensible markup language (XML) or the like, with the various algorithms being implemented with any combination of data structures, objects, processes, routines or other programming elements. Further, it should be noted that the system may employ any number of conventional techniques for data transmission, signaling, data processing, network control, or the like. Still further, the system may be used to detect or prevent security issues with a client-side scripting language, such as JavaScript, VBScript or the like.

Software elements may be loaded onto a general purpose computer, special purpose computer, or other programmable data processing apparatus to produce a machine, such that the instructions that execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

In various embodiments, components, modules, and/or engines of social network assistance system 115 may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Any communication, transmission and/or channel discussed herein may include any system or method for delivering content (e.g., data, information, metadata, and so forth), and/or the content itself. The content may be presented in any form or medium, and in various embodiments, the content may be delivered electronically and/or capable of being presented electronically. For example, a channel may comprise a website or device (e.g., Facebook, YOUTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g., IPsec, SSH, and so forth), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

With continued reference to FIG. 1A, in various embodiments, user 105 logs onto an application (e.g., a module) and Internet server 125 may invoke an application server 142. Application server 142 invokes logic in the social network assistance system 115 modules by passing parameters relating to user's 105 requests for data. Social network assistance system 115 manages requests for data from social network assistance system 115 modules and/or communicates with other system components. Transmissions between user 105 and Internet server 125 may pass through a firewall 120 to help ensure the integrity of social network assistance system 115 components. Practitioners will appreciate that exemplary embodiments may incorporate any number of security schemes or none at all. In various embodiments, Internet server 125 receives requests from client 110 and interacts with various other social network assistance system 115 components to perform tasks related to requests from client 110.

Internet server 125 may invoke an authentication server 130 to verify the identity of user 105 and assign roles, access rights and/or permissions to user 105. In order to control access to the application server 142 or any other component of social network assistance system 115, Internet server 125 may invoke an authentication server 130 in response to user 105 submissions of authentication credentials received at Internet server 125. In response to a request to access social network assistance system 115 being received at Internet server 125, Internet server 125 determines if authentication is required and transmits a prompt to client 110. User 105 enters authentication data at client 110, which transmits the authentication data to Internet server 125. Internet server 125 passes the authentication data to authentication server 130 which queries the user database 140 for corresponding credentials. In response to user 105 being authenticated, user 105 may access various applications and their corresponding data sources. Moreover, social network assistance system 115 may utilize any suitable authentication schemes and/or approaches, as desired.

With reference now to FIGS. 1A through 1D, various prior approaches to managing large-scale social media streams have suffered from various shortcomings, for example slow response times, duplicate replies, omitted responses, inadvertent responses, and so forth. Due to these and other shortcomings, customer impressions of corporate responsiveness and helpfulness in connection with social media interactions are often unfavorable.

In contrast, principles of the present disclosure contemplate approaches to social media stream management wherein social media inquiries may be addressed within a prompt time period (i.e., less than 30 minutes, less than 15 minutes, less than 10 minutes, and/or the like). Moreover, principles of the present disclosure contemplate use of integrated customer information in connection with social media response management such that a holistic view of the customer is available to a customer service representative, facilitating improved dispute resolution outcomes, greater customer goodwill, enhanced personalization, and so forth. This approach recognizes that principles for effective social-media based customer service may necessarily differ from conventional customer service approaches, for example due at least in part to public view of the interaction process, differing customer expectations for social network interactions as compared to conventional interactions (for example, telephone, email, and/or the like), and so forth.

Utilizing principles of the present disclosure, for example according to social network assistance systems and methods as disclosed herein, allows an organization (for example, a customer service team) to promptly respond to customer inquiries, flag inappropriate content, transition to conventional customer service interaction channels, avoid duplication of efforts when assisting customers, and so forth. Moreover, exemplary social network assistance systems may provide customer loyalty information to customer service representatives, facilitating more relevant responses to customer inquiries. Additionally, exemplary social network assistance systems can access and/or provide itinerary information; the systems may also filter posts to only show posts that have not yet been responded to. Yet further, exemplary social network assistance systems may provide a look-up database of frequently utilized links to external resources, reducing human error and reducing average response time. Still further, exemplary social network assistance systems may provide entire conversation histories (including both public and/or private messages). It will be appreciated that all these approaches improve customer interaction outcomes.

With continued reference to FIGS. 1A through 1D, in various exemplary embodiments social network assistance system 115 is configured to manage interaction with a Twitter stream. In various exemplary embodiments, social network assistance system 115 receives real time tweets from Twitter, for example using the Twitter streaming API. Relevant tweets maybe persisted, for example in CDR 150.

In various exemplary embodiments, social network assistance system 115 uses the Twitter REST API to make various on-demand requests for operations, for example to view the Twitter profile of a user, review the timeline of a user, review the mentions of a user, send outgoing tweets, direct messages on behalf of an entity to another entity or entities, and so forth.

In certain exemplary embodiments, social network assistance system 115 may be integrated with and/or interface with customer service systems and/or networks. For example, social network assistance system 115 may be linked to a customer hub and may link customer information (for example, name, rewards number, tier status, and/or the like) to Twitter information in CDR 150. In this manner, a customer service representative, while utilizing social network assistance system 115, can access more comprehensive information about a customer or customers while interacting with them on Twitter.

In various embodiments, streamer module 143 is configured to monitor, receive, and/or process tweets. Streamer module 143 may utilize Twitter4J or other suitable process to collect tweets. Streamer module 143 may authenticate with Twitter in any suitable manner, for example using OAuth authentication with access tokens.

Streamer module 143 may be operable on-demand, on a schedule, on a "triggered" basis (for example, each time a trigger event occurs, such as a tweet), and/or continuously, as desired, in order to receive and/or process tweets. Streamer module 143 may be subscribed to a social media channel, for example a Twitter feed or other social channel supporting a streaming API, and may be notified in real time when a message directed to or from a target user (for example, an airline) is posted. Via operation of streamer module 143, incoming messages may be displayed to customer service representatives within only a few seconds of posting.

Data module 145 receives tweets from streamer module 143. Data module 145 is configured to store and/or retrieve tweets and other system data in CDR 150. For example, data module 145 may store and/or retrieve tweets, other customer communications, user information, uniform resource locators, customer loyalty information, travel information, social media profile information, and/or the like in a suitable storage system.

Web module 147 facilitates user 105 interaction with social network assistance system 115. In various exemplary embodiments, web module 147 provides an interface to social network assistance system 115 for a customer service representative. For example, web module 147 may: display categorized social media communications as such communications are sent and received; provide an interface for replies to customers; display a customer's social media profile, loyalty information, travel information, and/or the like; and/or provide message searching capabilities. Yet further, web module 147 may facilitate collaboration and/or data sharing between customer service representatives.

In various exemplary embodiments, social network assistance system 115 facilitates, for example via reverse Ajax or other suitable server-browser connection technique, near-instantaneous updates between customer service representatives. Moreover, in social network assistance system 115, messages may be persistent in order to enable display of public and/or private conversations. Additionally, loyalty information caching allows a customer service representative to have more information regarding a customer while a conversation with such customer proceeds.

In various exemplary embodiments, social network assistance system 115 is configured with a countdown tool. In this tool, each not-yet replied-to tweet in a twitter stream is associated with an incrementing counter (for example, a timer). Accordingly, social network assistance system 115 may be configured to have a customer service agent attend to the oldest unreplied tweet. In this manner, no customer tweet is permitted to receive a disproportionately long delay in response, as the oldest tweet is attended to next. Moreover, social network assistance system 115 may also be configured with sorting and/or prioritizing algorithms. For example, a tweet from a customer identified as a high-volume traveler (or associated with a high-priority client, past bookings that are desirable from a revenue management perspective, and/or the like) may be routed to the front of the processing queue for even faster response times than the already prompt response times facilitated by general application of social network assistance system 115.

In various exemplary embodiments, social network assistance system 115 is configured with locking functionality. A particular tweet may be "locked" to a single customer service agent, single window, and/or the like, such that no other customer service agent, window, or process is permitted to reply or otherwise interact with that tweet and/or that customer. In this manner, duplicate replies may be avoided. This permits many individual customer service agents to simultaneously work on and/or manage a single Twitter stream while avoiding "collisions" or other data coherency or consistency problems. Additionally, customer response times are reduced as more customer service agents are added, as many tweets can be removed from the incoming queue and handled individually, rather than having multiple tweets queued up for processing by a single customer service agent.

In various exemplary embodiments, social network assistance system 115 is configured with flagging functionality. A particular tweet may be flagged as assigned to a single customer service agent, single window, and/or the like, such that any other customer service agent, window, or process that attempts to reply or otherwise interact with that tweet and/or that customer is notified that the tweet or customer is currently being assisted by another customer service agent. In this manner, duplicate replies may be reduced and/or eliminated, while still permitting multiple customer service agents (for example, a front line agent and a supervisor) to interact with a single customer and/or tweet when appropriate. This permits many individual customer service agents to simultaneously work on and/or manage a single Twitter stream while reducing and/or eliminating "collisions" or other data coherency or consistency problems. Additionally, customer response times are reduced as more customer service agents are added, as many tweets can be removed from the incoming queue and handled individually, rather than having multiple tweets queued up for processing by a single customer service agent.

In various exemplary embodiments, social network assistance system 115 is configured with archiving functionality. In this manner, various information, for example tweets, responses, customer service agent annotations, linked images, and/or the like, may be preserved for later auditing, assessment, quality control, governmental agency inquiries, legal proceedings, and so forth.

In various exemplary embodiments, social network assistance system 115 is configured to interface with internal and/or external corporate communications systems. For example, social network assistance system 115 may be coupled to a corporate instant messaging system, social network, email system, and/or the like. In this manner, a tweet about a particular flight may be forwarded and/or shared, for example with a gate agent, flight attendant, luggage handler, or other corporate personnel associated with that flight or related flights. In this manner, in addition to direct interaction via a social network, the customer may also and/or alternatively be assisted in-person, for example via a flight attendant visit to a particular seat on an airplane where a customer is located.

In various exemplary embodiments, use of social network assistance system 115 enables rapid response to individual tweets in a high-volume twitter stream. In one exemplary embodiment, social network assistance system 115 enabled an average response time of less than 15 minutes in connection with a Twitter stream exceeding 2500 incoming tweets per day. In contrast, prior systems have not been able to facilitate comparable response times nor able to facilitate management of such high-volume Twitter streams.

Figure 2:
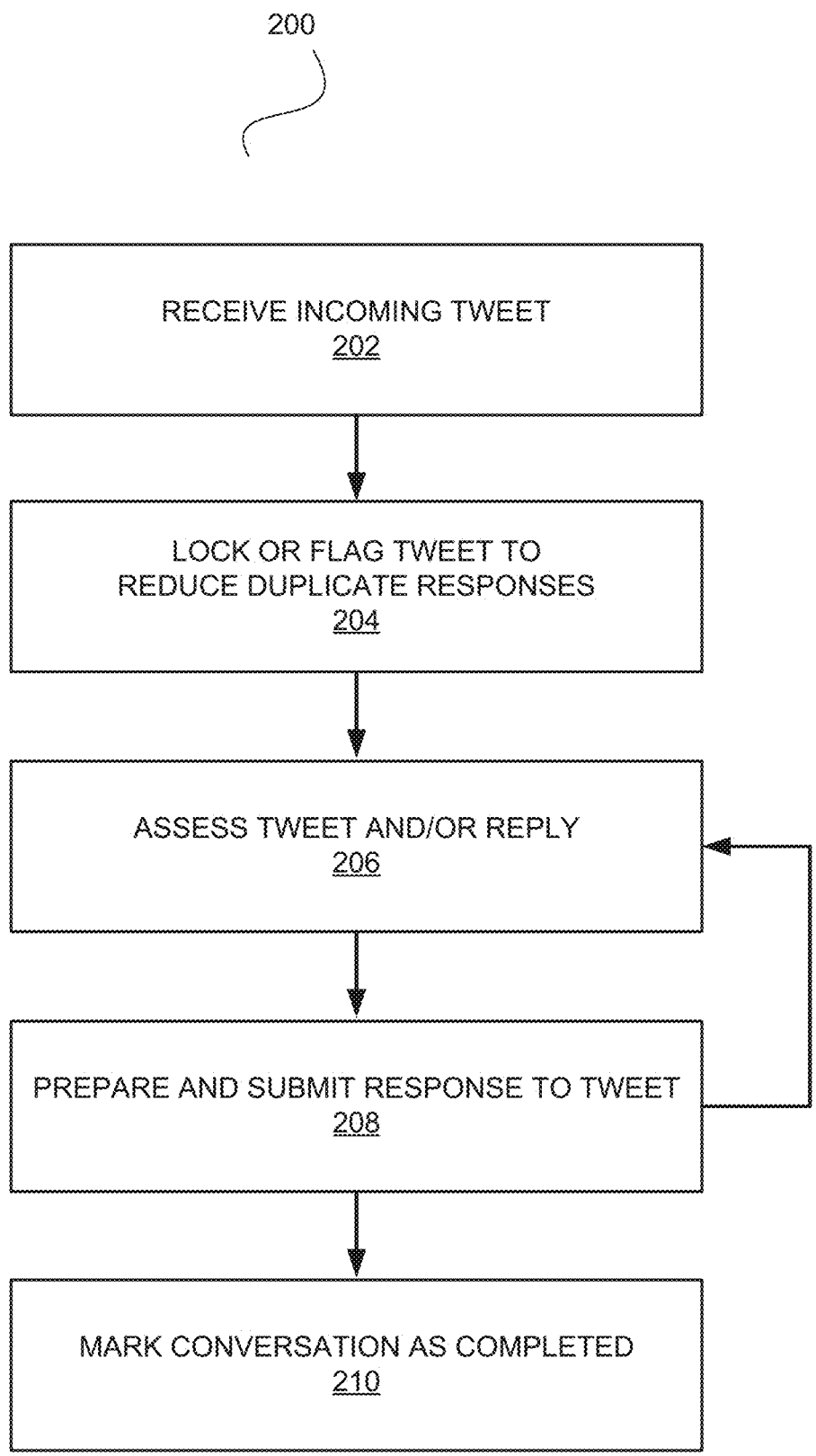
FIG. 2 illustrates a method for social network management in accordance with various embodiments.

With reference now to FIG. 2, in various exemplary embodiments a method 200 for social media management comprises receiving, via a social network assistance system 115, a tweet (step 202). In social network assistance system 115, the tweet is locked to a customer service representative (and/or flagged as assigned to a customer service representative), reducing or preventing duplicate replies (step 204). A designated customer service representative (and/or automated tool or module in social network assistance system 115) conducts an assessment of the tweet (step 206), for example in order to facilitate classification, queueing, and/or response preparation.

A response to the tweet is prepared and posted (step 208). The response and associated preparation may include, for example, review of customer data, flight booking data, historical data, evaluation of expenses associated with potential remedial courses of action to address a customer issue, evaluation of potential alternative booking arrangements, and/or the like. Moreover, the response and associated preparation may include forwarding the tweet and related customer information to an airline representative for use in connection with a personal interaction to address a customer issue. Such personal interaction may take the form of a phone call, an in-person conversation with a gate agent, a seat visit from a flight attendant, delivery of a convenience item to a customer seat, and/or the like. Steps 206 and/or 208 may be repeated, as desired, for example responsive to further tweets received from a customer. Once a customer issue is resolved or the conversation otherwise terminates, the case may be marked as complete or resolved (step 210).

In various exemplary embodiments, in social network assistance system 115, social communications that have not yet been replied to may be prioritized and/or elevated. In this manner, average response times are reduced. Moreover, social network assistance system 115 may alert a particular customer service representative if a different customer service is already responding to a same message, reducing duplicate efforts. Additionally, social network assistance system 115 may assign messages and/or units of work to a particular customer service representative, enabling a subject matter expert to assist a customer more efficiently. Additionally, a message may be manually or automatically routed from a first customer service representative to a second customer service representative (for example, in a different department, work group, or the like) so that the message may be handled more efficiently and/or appropriately. Yet further, social network assistance system 115 may display loyalty and travel information while a customer service representative responds to a social media posting, enabling the customer service representative to quickly resolve common issues.

In various embodiments, through use of an exemplary social network assistance system 115, service-based industries, for example airlines, may promptly and effectively respond to incoming tweets, generating increased customer goodwill and positive public exposure.

Principles and features of the present disclosure may suitably be combined with principles of revenue management, for example as disclosed in U.S. patent application Ser. No. 13/348,417 filed on Jan. 11, 2012, now U.S. Pat. No. 8,600,787 entitled "Dynamic Cost Analysis and Overbooking Optimization Methods and Systems" which is incorporated herein by reference in its entirety.

Principles and features of the present disclosure may also suitably be combined with principles of reserve forecasting, for example as disclosed in U.S. patent application Ser. No. 13/793,049 entitled "Reserve Forecasting Systems and Methods" filed on Mar. 11, 2013, now U.S. Pat. No. 10,102,487, which is incorporated herein by reference in its entirety.

Principles and features of the present disclosure may also suitably be combined with principles of operational reliability, for example as disclosed in U.S. patent application Ser. No. 13/966,723 entitled "Operational Reliability Systems and Methods" filed on Aug. 14, 2013, now U.S. Pat. No. 9,135,670, which is incorporated herein by reference in its entirety.

Principles of the present disclosure may suitably be combined with principles of forecasting, demand modeling, and/or the like, for example as disclosed in U.S. patent application Ser. No. 13/791,672 entitled "Demand Forecasting Systems and Methods Utilizing Unobscuring and Unconstraining" filed on Mar. 8, 2013 (now U.S. Pat. No. 9,727,940), U.S. patent application Ser. No. 13/791,691 entitled "Demand Forecasting Systems and Methods Utilizing Fare Adjustment" filed on Mar. 8, 2013 (now U.S. Patent Application Publication No. 2014-0257881), and U.S. patent application Ser. No. 13/791,711 entitled "Demand Forecasting Systems and Methods Utilizing Prime Class Remapping" filed on Mar. 8, 2013 (now U.S. Patent Application Publication No. 2014-0257882), each of which are incorporated herein by reference in their entirety.

Principles and features of the present disclosure may also suitably be combined with principles of departure sequencing, for example as disclosed in U.S. patent application Ser. No. 13/833,761 entitled "Departure Sequencing Systems and Methods" filed on Mar. 15, 2013, now U.S. Pat. No. 9,437,114, which is incorporated herein by reference in its entirety.

Principles and features of the present disclosure may also suitably be combined with principles of misconnect management, for example as disclosed in U.S. patent application Ser. No. 13/837,462 entitled "Misconnect Management Systems and Methods" filed on Mar. 15, 2013, now U.S. Patent Application Publication No. 2014-0278615, which is incorporated herein by reference in its entirety.

While the present disclosure may be described in terms of a tweet, an airline, a customer service representative, and so forth, one skilled in the art can appreciate that similar features and principles may be applied to other social communications methods (e.g., Facebook, Instagram, WhatsApp, and/or the like), industries, and/or the like.

While the exemplary embodiments described herein are described in sufficient detail to enable those skilled in the art to practice principles of the present disclosure, it should be understood that other embodiments may be realized and that logical and/or functional changes may be made without departing from the spirit and scope of the present disclosure. Thus, the detailed description herein is presented for purposes of illustration and not of limitation.

For the sake of brevity, conventional data management, computer networking, social media, software application development, and other aspects of exemplary systems and methods (and components thereof) may not be described in detail herein. Furthermore, the connecting lines shown in the various figures contained herein are intended to represent functional relationships and/or physical or communicative couplings between the various elements. It should be noted that many alternative or additional functional relationships or physical connections may be present in a practical forecasting system.

While the description references specific technologies, system architectures and data management techniques, practitioners will appreciate that this description is of various embodiments, and that other devices and/or methods may be implemented without departing from the scope of principles of the present disclosure. Similarly, while the description references a user interfacing with the system via a computer user interface, practitioners will appreciate that other interfaces may include mobile devices, kiosks and handheld devices such as mobile phones, smart phones, tablet computing devices, etc.

While the steps outlined herein represent exemplary embodiments of principles of the present disclosure, practitioners will appreciate that there are any number of computing algorithms and user interfaces that may be applied to create similar results. The steps are presented for the sake of explanation only and are not intended to limit the scope of the present disclosure in any way. Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all of the claims.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement principles of the disclosure in alternative embodiments.

It should be understood that the detailed description and specific examples, indicating exemplary embodiments, are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. A method comprising:

monitoring, by one or more processors, multiple social media electronic posts in a communication stream;

determining, by the one or more processors, an assignment of a social media electronic post based on itinerary information, flight information, travel information and a highest value of an incrementing counter among incrementing counters for the multiple social media electronic posts received by the processor;

implementing, by the one or more processors, the assignment to a first incoming queue of a first customer service agent for processing of a social media electronic post by a first customer within the communication stream of the multiple social media electronic posts;

removing, by the one or more processors, the social media electronic post by the first customer from a second incoming queue of a second customer service agent;

electronically flagging, by the one or more processors using flagging functionality, the social media electronic post by the first customer that was removed to create a flagged social media electronic post within the communication stream of the multiple social media electronic posts, wherein the flagged social media electronic post includes a flag indicator set in a flag data field associated with a social media data field that stores data about the social media electronic post, and wherein the flag data field and the social media data field are for a database instance such that the values of the flag data field and the social media data field persist for the database instance;

determining, by the one or more processors, any subsequent social media electronic post by the first customer to the first incoming queue of the first customer service agent;

locking, by the one or more processors and based on the flagging functionality, the flagged social media electronic post by the first customer and any subsequent social media electronic post by the first customer to the first incoming queue of the first customer service agent, in response to the determining that the subsequent social media electronic post is by the first customer to the first incoming queue of the first customer service agent, wherein the locking identifies the flagged social media electronic post and, based on the electronically flagging, does not permit the second customer service agent to reply or interact with the flagged social media electronic post by the first customer and any subsequent social media electronic post by the first customer within any communication stream of the multiple social media electronic posts;

receiving, by the one or more processors, an attempt by the second customer service agent to reply or interact with the flagged social media electronic post by the first customer and any subsequent social media electronic post by the first customer within any communication stream of the multiple social media electronic posts; and notifying, by the one or more processors and in response to the attempt, the second customer service agent that the second customer service agent is not permitted to reply or interact with the flagged social media electronic post by the first customer and any subsequent social media electronic post by the first customer within any communication stream of the multiple social media electronic posts, in response to the second customer service agent attempting to interact with the flagged social media electronic post by the first customer and any subsequent social media electronic post by the first customer.

2. The method of claim 1, wherein the assigning the social media electronic post is based on a highest value of an incrementing counter among incrementing counters for a plurality of social media electronic posts received by the processor.

3. The method of claim 2, wherein the incrementing counter is configured to increment until the social media electronic post receives a reply.

4. The method of claim 2, wherein the highest value is weighted against at least one of customer status, travel volume, loyalty information, tier status, identification information, social media profile information, other social media electronic postings, mentions on social media accounts, electronic posting timelines, or classification of the social media electronic post.

5. The method of claim 1, further comprising restricting, by the processor, the second customer service agent from interacting with the flagged social media electronic post.

6. The method of claim 1, wherein the first customer service agent at least one of responds to the social media electronic post, flags inappropriate content, or transitions a customer associated with the social media electronic post to another form of communication.

7. The method of claim 1, further comprising providing, by the processor, to the first customer service agent at least one of frequently used links, customer loyalty information, itinerary information, flight information, travel information, tier status, identification information, social media profile information, other social media electronic postings, mentions on social media accounts, or electronic posting timelines.

8. The method of claim 1, further comprising filtering, by the processor, a plurality of social media electronic posts to include the social media electronic posts that have not received a response, wherein the plurality of social media electronic posts includes the social media electronic post.

9. The method of claim 1, wherein the flagging the social media electronic post includes locking the social media electronic post.

10. The method of claim 1, wherein the receiving the social media electronic post is via a streamer module.

11. The method of claim 1, wherein the social media electronic post is persistent to allow display of a conversation including a plurality of social media electronic posts.

12. The method of claim 1, wherein the assigning is further based upon at least one of customer status, travel volume, loyalty information, tier status, identification information, social media profile information, other social media electronic postings, mentions on social media accounts, electronic posting timelines, or classification of the social media electronic post.

13. The method of claim 1, wherein the assigning is further based upon subject matter of the social media electronic post.

14. The method of claim 1, further comprising;

receiving, by the processor, the social media electronic post that was posted by the first customer in a public social media account;

associating, by the processor, the social media electronic post with an incrementing counter that increases in value so long as the social media electronic post has not yet been replied to; and determining, by the processor, that the incrementing counter for the social media electronic post has the highest value among incrementing counters for the plurality of social media electronic posts received by the processor.

15. The method of claim 1, wherein the notifying includes notifying an entity that attempts to interact with the social media electronic post that the first customer service agent is already interacting with the social media electronic post.

16. The method of claim 1, further comprising interfacing, by the processor, with a system that provides information about at least one of the first customer that posted the social media electronic post or the social media electronic post.

17. The method of claim 1, further comprising providing, by the processor, a request to interact with the first customer that posted the social media electronic post.

18. The method of claim 1, further comprising providing, by the processor, notice to the first customer service agent to follow-up with the first customer that posted the social media electronic post.

19. The method of claim 1, further comprising flagging, by the processor, the social media electronic post as resolved.

20. A system comprising:

one or more processors; and one or more tangible, non-transitory memories configured to communicate with the one or more processors, the one or more tangible, non-transitory memories having instructions stored thereon that, in response to execution by the one or more processors, cause the one or more processors to perform operations comprising:

monitoring, by the one or more processors, multiple social media electronic posts in a communication stream;

determining, by the one or more processors, an assignment of a social media electronic post based on itinerary information, flight information, travel information and a highest value of an incrementing counter among incrementing counters for the multiple social media electronic posts received by the processor;

implementing, by the one or more processors, the assignment to a first incoming queue of a first customer service agent for processing of a social media electronic post by a first customer within the communication stream of the multiple social media electronic posts;

removing, by the one or more processors, the social media electronic post by the first customer from a second incoming queue of a second customer service agent;

electronically flagging, by the one or more processors using flagging functionality, the social media electronic post by the first customer that was removed to create a flagged social media electronic post within the communication stream of the multiple social media electronic posts, wherein the flagged social media electronic post includes a flag indicator set in a flag data field associated with a social media data field that stores data about the social media electronic post, and wherein the flag data field and the social media data field are for a database instance such that the values of the flag data field and the social media data field persist for the database instance;

determining, by the one or more processors, any subsequent social media electronic post by the first customer to the first incoming queue of the first customer service agent;

locking, by the one or more processors and based on the flagging functionality, the flagged social media electronic post by the first customer and any subsequent social media electronic post by the first customer to the first incoming queue of the first customer service agent, in response to the determining that the subsequent social media electronic post is by the first customer to the first incoming queue of the first customer service agent, wherein the locking identifies the flagged social media electronic post and, based on the electronically flagging, does not permit the second customer service agent to reply or interact with the flagged social media electronic post by the first customer and any subsequent social media electronic post by the first customer within any communication stream of the multiple social media electronic posts;

receiving, by the one or more processors, an attempt by the second customer service agent to reply or interact with the flagged social media electronic post by the first customer and any subsequent social media electronic post by the first customer within any communication stream of the multiple social media electronic posts; and notifying, by the one or more processors and in response to the attempt, the second customer service agent that the second customer service agent is not permitted to reply or interact with the flagged social media electronic post by the first customer and any subsequent social media electronic post by the first customer within any communication stream of the multiple social media electronic posts, in response to the second customer service agent attempting to interact with the flagged social media electronic post by the first customer and any subsequent social media electronic post by the first customer.

* * * * *